(12) United States Patent
Muntz

(10) Patent No.: US 6,842,754 B2
(45) Date of Patent: Jan. 11, 2005

(54) LEASE ENFORCEMENT IN A DISTRIBUTED FILE SYSTEM

(75) Inventor: Daniel A. Muntz, Cupertino, CA (US)

(73) Assignee: Hewlett Packard Development Company, L.P., Houston, TX (US)

(*) Notice: Subject to any disclaimer, the term of this patent is extended or adjusted under 35 U.S.C. 154(b) by 294 days.

(21) Appl. No.: 09/836,828

(22) Filed: Apr. 17, 2001

(65) Prior Publication Data

US 2002/0152214 A1 Oct. 17, 2002

(51) Int. Cl.[7] ............................................. G06F 17/30
(52) U.S. Cl. ........................................ 707/10; 707/200
(58) Field of Search .................. 707/1–10, 100–104.1, 707/200–206

(56) References Cited

U.S. PATENT DOCUMENTS

| | | | | |
|---|---|---|---|---|
| 6,237,009 B1 | * | 5/2001 | Waldo et al. | 707/206 |
| 6,263,350 B1 | * | 7/2001 | Wollrath et al. | 707/206 |
| 6,499,049 B2 | * | 12/2002 | Waldo et al. | 709/104 |

OTHER PUBLICATIONS

Cary G. Gray et al., Leases: An Efficient Fault–Tolerant Mechanism for Distributed File Cache Consistency, ACM, 202–210.*

Liskov , "Practical Uses of Synchronized Clocks in Distributed Systems", ACM, 1991, 1–9.*

* cited by examiner

Primary Examiner—Shahid Alam
Assistant Examiner—Jean Bolte Fleurantin

(57) ABSTRACT

System and method for managing leases in a distributed file system. A meta-data server is employed to manage leases to the objects in the distributed file system, and a plurality of storage servers provide data storage for the objects. The meta-data server grants leases for objects to the clients. With each lease granted, the meta-data server provides data that indicate the time at which the lease will expire for the associated object. The lease expiration time is included in a subsequent request to the storage server for access to the object. The storage server determines whether the lease has expired. If the lease has expired, the requested access is denied. Otherwise, the storage server provides the requested access.

15 Claims, 4 Drawing Sheets

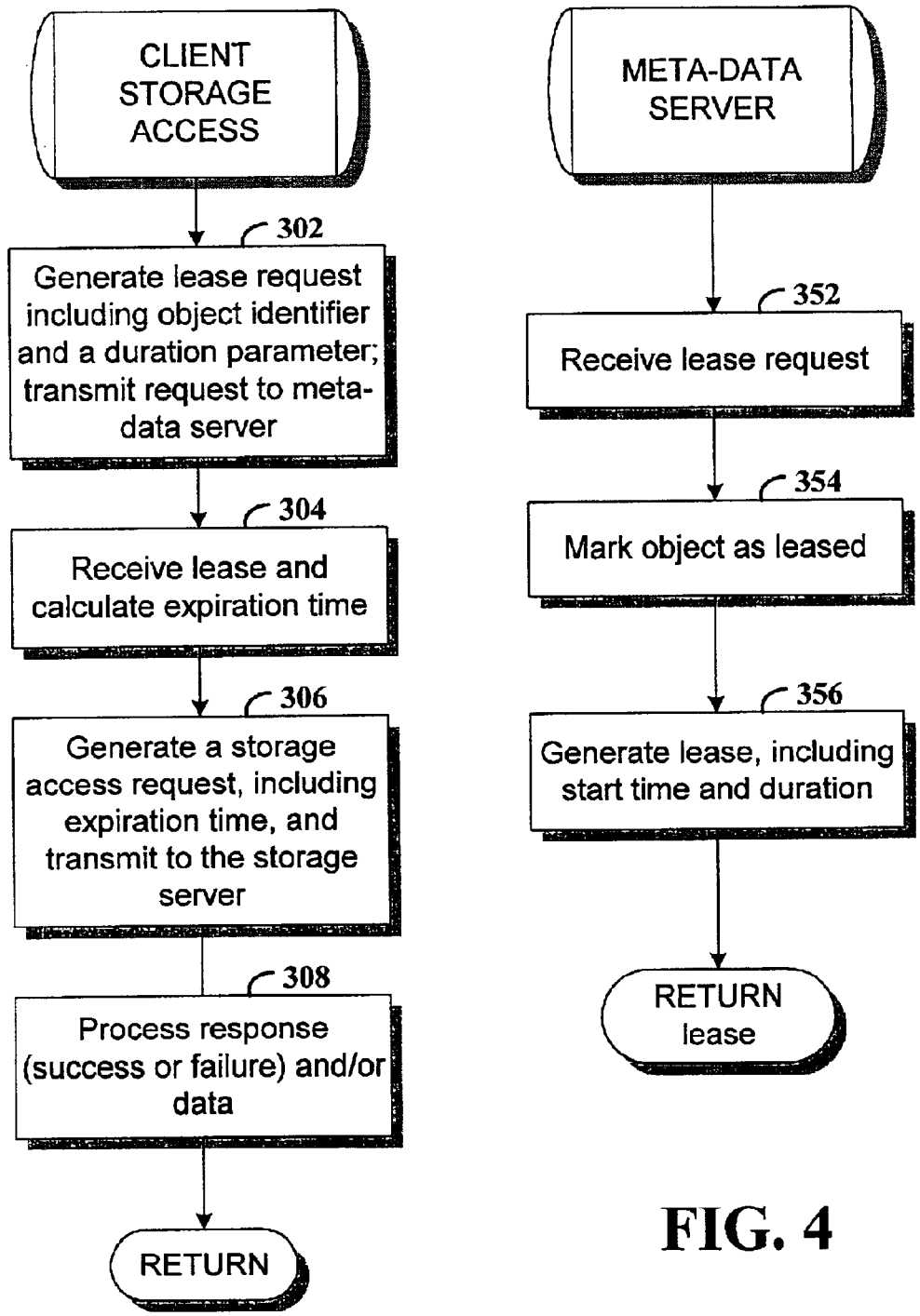

LEASE ENFORCEMENT IN A DISTRIBUTED FILE SYSTEM

FIELD OF THE INVENTION

The present invention generally relates to distributed file systems, and more particularly to lease enforcement in distributed file systems.

BACKGROUND

Conceptually, a physical file system architecture includes system meta-data, $M_{sys}$, object meta-data, $M_{object}$, and object data. The $M_{sys}$ data describes the entire file system. For example, $M_{sys}$, includes system parameters, an i-node bitmap, a block bitmap and other file system-dependent information.

The $M_{object}$ data describes a file or directory. In an example physical file system, a particular $M_{object}$ segment includes the file i-node and direct and indirect blocks. The i-node includes information such as the name of the file, access rights, update times, pointers to data blocks, and pointers to indirect, double indirect, and triple indirect blocks. The indirect blocks also contain pointers to data blocks. The file data is the data referenced and manipulated by one or more client application programs.

A distributed file system is generally characterized by multiple storage servers that store and serve data to client applications. The storage servers and systems that host the client applications are connected to a network. A locking mechanism provides data consistency as between multiple clients. For example, when a client is writing to a file, the i-node is locked to prevent another client from manipulating the same file. Any operations that result in allocating or de-allocating i-node or data blocks cause the associated bitmap areas to be locked.

In some distributed file systems, the locking mechanism is provided by a meta-data server. The meta-data server manages some implementation-dependent combination of $M_{sys}$ and $M_{object}$, and separate storage servers provide storage for file data. A lease mechanism is often used for locking objects. Leases are managed and granted by the meta-data server. A lease for an object is for a selected period of time and is granted in response to a lease request from a client. The type of lease granted to one client determines whether a lease will be granted to another client. For example, if one client is granted a write lease, no other client will be granted a write lease until the first write lease expires.

The separation of storage servers from the meta-data server creates the potential for timing-related problems in servicing write leases. Since the storage server is not involved in the management of leases, it does not have the information necessary to enforce data consistency by providing or denying file access requested from a client. However, if too much information is shared between the meta-data server and the storage servers, the benefits of scalability provided by the separation of functions would be adversely impacted.

A system and method that address the aforementioned problems, as well as other related problems, are therefore desirable.

SUMMARY OF THE INVENTION

In various embodiments, the invention manages leases in a distributed file system. A meta-data server is employed to manage leases to the objects in the distributed file system, and a plurality of storage servers provide data storage for the objects. The meta-data server grants leases for objects to the clients. With each lease granted, the meta-data server provides data that indicate the time at which the lease will expire for the associated object. The lease expiration time is included in a subsequent request to the storage server for access to the object. The storage server determines whether the lease has expired. If the lease has expired, the requested access is denied. Otherwise, the storage server provides the requested access.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 3 is a flowchart of a process performed by a client in submitting a lease request and a storage access request in accordance with one embodiment of the invention;

FIG. 4 is a flowchart of a process performed by the meta-data server in processing a lease request in accordance with one embodiment of the invention.

DETAILED DESCRIPTION

The present invention is directed to lease management in a distributed file system, where a meta-data server manages the file system meta-data and a plurality of storage servers manage file data. The meta-data server manages the granting of leases to clients, each lease having an expiration time. After a client has been granted a lease, the client generates a storage access request that includes a reference to an object and in addition, the expiration time of the lease. The storage servers use the expiration times in the storage access requests from the clients in determining whether to provide or deny the requested access.

Figure 1:
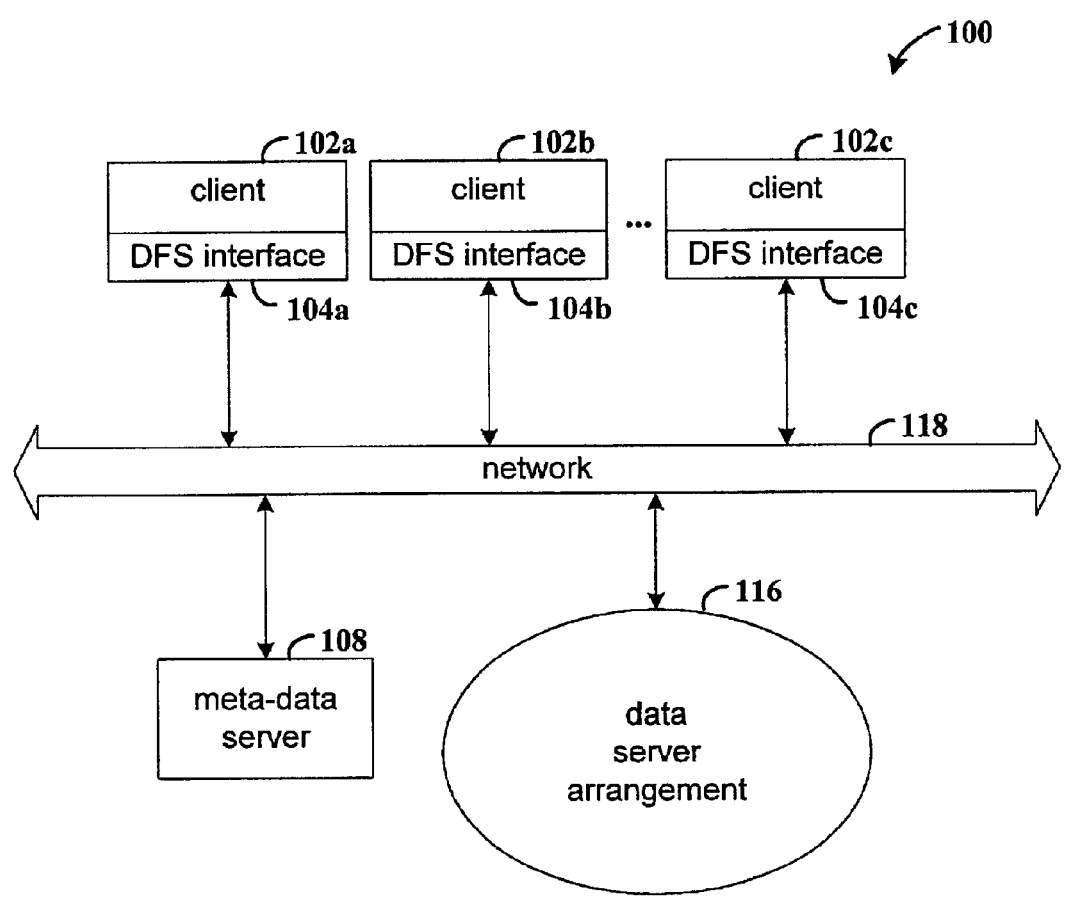
FIG. 1 is a functional block diagram of a computing arrangement in accordance with one embodiment of the invention.

FIG. 1 is a functional block diagram of a computing arrangement in accordance with one embodiment of the invention. Arrangement 100 includes multiple client systems 102a–c, each having a distributed file system interface 104a–c. File system meta-data is managed by meta-data server 108, and data server arrangement 116 provides storage for file data. The components are coupled by a conventional local or wide area network 118.

When an application hosted on one of clients 102a–c seeks access to an object stored by data server arrangement 116, the associated DFS interface 104a–c generates a lease request to meta-data server 108. The lease request references the object. Depending on implementation requirements, the lease request optionally includes a parameter that specifies a lease duration. When the requested object is available, the meta-data server responds with a lease. The lease to the client indicates the time at which the lease commenced and the duration of the lease. Depending on the implementation requirements, the duration of the lease granted by the meta-data server may be selected solely at the discretion of the meta-data server. Alternatively, the duration may be determined in response to a variety of factors, such as a duration requested by the client and the number of competing lease requests.

After having been granted a lease to an object, the DFS interface (on behalf of a client application) prepares to submit a data access request to the data server arrangement 116. Before submitting the request, the expiration time of the lease is determined (lease commencement time+lease duration) using the lease information returned from the meta-data server 108. The data access request to the data server arrangement 116 includes a reference to the data along with the lease expiration time.

Upon receiving a data access request from a client, a storage server (a component within the data server arrangement 116) determines whether the requesting client still has a valid lease to the referenced data using the expiration time in the request. If the expiration time is before the current time, the lease has expired and the requesting client is denied access. Otherwise, the requested access is granted.

In order for the components of the data server arrangement 116 to determine whether a lease is valid using the expiration time and current time, the clocks used by the meta-data server and data server arrangement 116 for lease management must be synchronized. In one embodiment, synchronization between the components is performed using a conventional synchronization protocol, for example, NTP.

In one embodiment, DFS interface 104, meta-data server 108, and data server arrangement are implemented with conventional hardware and software adapted to perform the functions described herein. U.S. patent/application Ser. No. 09/774,841, entitled, "EXTENDING A STANDARD-BASED REMOTE FILE ACCESS PROTOCOL AND MAINTAINING COMPATIBILITY WITH A STANDARD PROTOCOL STACK" by Karamanolis et al., filed on Jan. 31, 2001, and assigned to the assignee of the present invention, describes another embodiment for implementing the DFS interface 104a and is hereby incorporated by reference.

In another embodiment, data server arrangement 116 is implemented with a storage area network (SAN). A SAN can be implemented with an Internet Protocol (IP) arrangement such as iSCSI, or with a fiber channel arrangement. Software such as McData's SAN Management and IBM's Tivoli is required to manage and configure a SAN.

Figure 2:
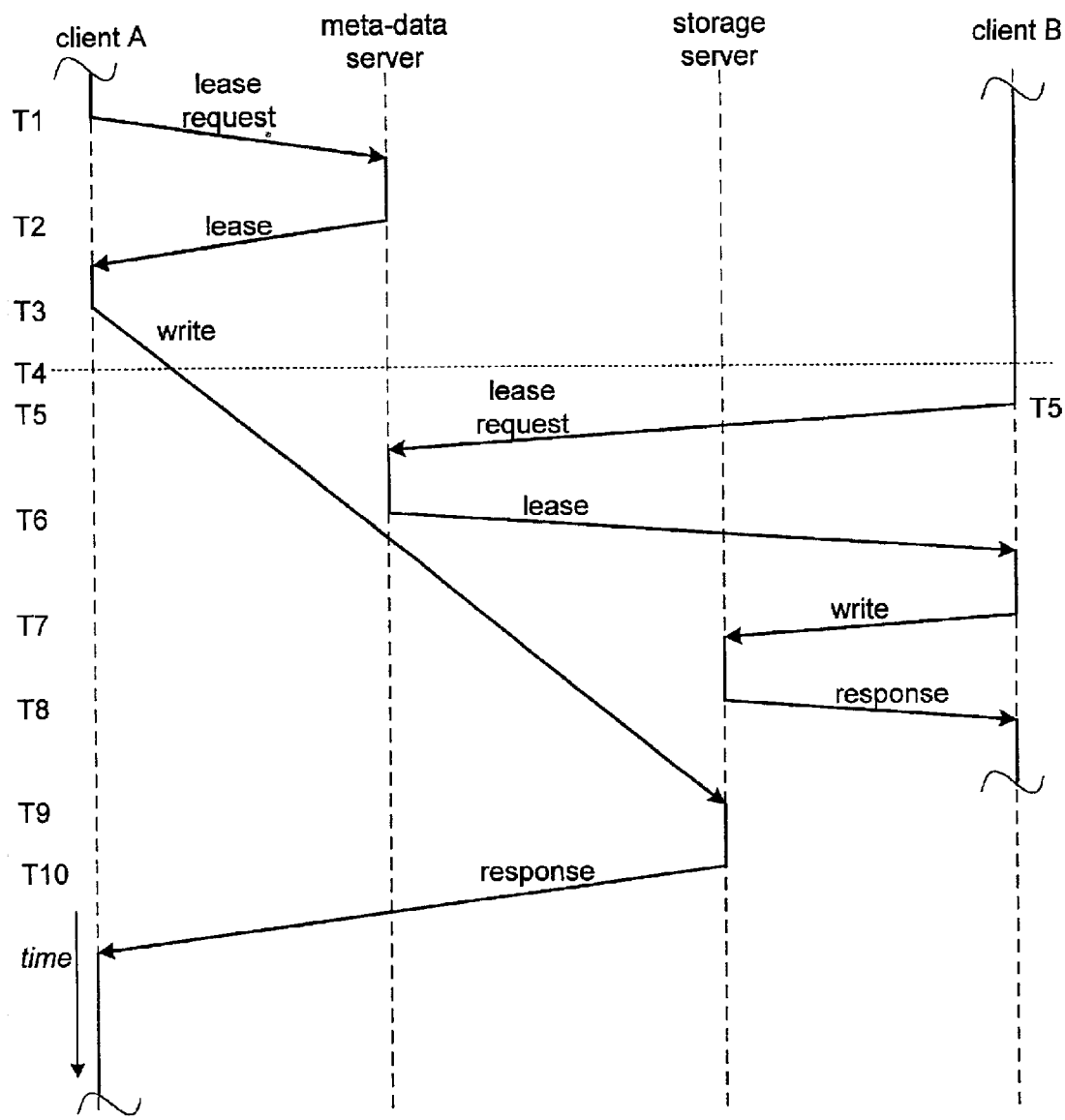
FIG. 2 is an object interaction diagram that illustrates two clients seeking write access to the same object.

FIG. 2 is an object interaction diagram that illustrates two clients seeking write access to the same object. The interaction diagram provides a scenario that shows the potential for error, and the description below explains how the invention avoids such error without creating great bandwidth demands or processing demands on either the meta-data server or storage server. The solid vertical lines represent control within the corresponding components, and the directional diagonal lines represent requests and responses passed between the components.

At time T1, client A submits a write lease request to the meta-data server for object X. When the meta-data server determines that the write lease can be granted, the lease is returned to client A at time T2. According to one embodiment, the lease returned by the meta-data server includes the time at which the lease commenced and the duration of the lease. At time T3, client A transmits a write request to the storage server for block X, which in the scenario does not arrive at the storage server until time T9. However, client A's lease expires at time T4.

Before client A's write to block X is received and processed by the storage server and after client A's lease to block X expires at time T4, client B submits a write lease request for block X to the meta-data server at time T5. Since client A's lease expired at time T4, the meta-data server is able to grant and return the lease to block X to client B at time T6. At time T7, client B transmits a write request for block X to the storage server, and at time T8 the storage server responds with a status code indicating a successful write.

At time T9, client A's write to block X arrives at the storage server. If the present invention were not employed, the storage server would process the write request and overwrite the data in block X that was written by client B with the data provided by client A. Furthermore, at time T10 the meta-data server would respond to client A that the write was successful. If client B's lease were still valid after time T10 and client B issued a read of block X to the storage server, the storage server would respond with that that have been corrupted by client A.

With the present invention, along with each file access request transmitted to the storage server, the clients transmit expiration times for the objects referenced in the storage access requests. In the present example, when client A transmits the write request to the storage server at time T3, the expiration time, T4, is also included. When the storage server receives a write request and lease expiration time, the expiration time is compared to the current time. If the lease expired before the current time, then the access is denied. Thus, since client A's lease expired at time T4, and the storage server received the write request at time T9, the write request is denied. Assuming that client B's lease expiration time was sometime after T7, the storage server provides the write access to object X for client B.

FIG. 3 is a flowchart of a process performed by a client in submitting a lease request and a storage access request in accordance with one embodiment of the invention. The "client" in this flowchart refers to the DFS interface 104a of FIG. 1. At step 302, in response to a file access request from an application program (not shown), the client generates a lease request. The lease request includes an object identifier so that the meta-data server knows which object to lease, along with the type of lease, read or write, for example. In one embodiment, the lease request also includes a duration parameter that specifies a requested duration for the lease. In another embodiment, the duration parameter is not present, and the meta-data server alone determines the duration. The lease request is then transmitted to the meta-data server.

At step 304, the client receives a lease from the meta-data server and calculates the lease expiration time. In an alternative embodiment, the meta-data server calculates the lease expiration time and returns the expiration time in the lease to the client. At step 306, a storage access request is generated and transmitted to a storage server responsible for the referenced object. Included in the storage access request is the lease expiration time for the referenced object.

At step 308, the client processes the response from the storage server. For example, for a read request the data provided by the storage server are returned to the calling application. Success and failure codes are also processed in accordance with implementation requirements, and control is returned to the calling application.

FIG. 4 is a flowchart of a process performed by the meta-data server in processing a lease request in accordance with one embodiment of the invention. At step 352, the meta-data server receives a lease request. The processing performed for a lease request when the requested object is already leased is implementation dependent. For example, multiple concurrent read leases may be permitted. For a write lease request, the request could be rejected if there are outstanding leases, the request could be blocked to wait for other leases to expire while rejecting new lease requests, or the request could trigger a recall of outstanding leases. Assuming the lease is granted, step 354 marks the object as leased.

At step 356, the meta-data server generates a lease response for the client. In one embodiment, the lease includes the time at which the lease commenced and the duration of the lease. In an alternative embodiment, the meta-data server calculates the lease expiration time (start time+duration) and includes the expiration time in the lease. The method by which the duration is determined is implementation dependent. For example, the duration may be determined strictly from a duration requested by the client. Alternatively, the duration may be determined strictly by the meta-data server. In yet another embodiment, the duration may be determined as a function of the duration requested by the client and the lease activity level associated with the object. After the duration has been determined, the lease is returned to the client.

Figure 5:
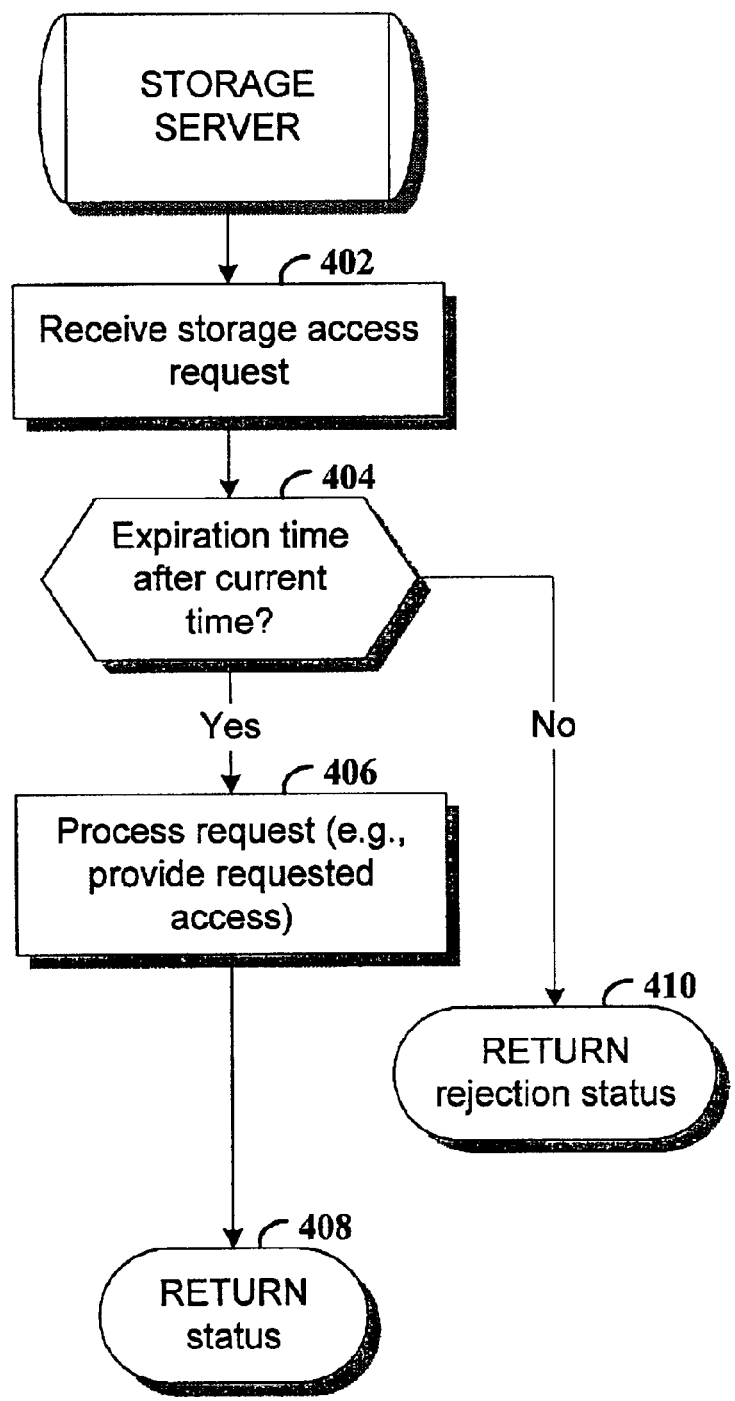
FIG. 5 is a flowchart of a process performed by the storage server in processing a storage access request in accordance with one embodiment of the invention.

FIG. 5 is a flowchart of a process performed by the storage server in processing a storage access request in accordance with one embodiment of the invention. At step 402, the storage server receives a storage access request. Decision step 404 tests the validity of the client's lease. If the expiration time in the storage access request is after the current time, the lease is valid and the process is directed to step 406. At step 406, the storage access request is processed in accordance with the type of access requested (e.g., read or write). A response that indicates the status of the request is then returned to the client (408).

If the expiration time in the storage access request indicates that the client's lease has already expired, a rejection status is returned to the client (410).

Those skilled in the art will recognize other aspects and embodiments of the present invention from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for managing access to objects by clients in a distributed file system including a storage server arrangement and a meta-data server, comprising:

managing leases on the objects at the meta-data server;

transmitting lease expiration data from the clients to the storage server arrangement along with storage access requests, the lease expiration data indicating a lease expiration time;

comparing at the storage server arrangement the lease expiration data to data indicating a current time; and denying access to the object if the lease expiration time is earlier than a current time.

2. The method of claim 1, further comprising transmitting lease requests from the clients to the meta-data server, each lease request including an object identifier and a requested lease duration.

3. The method of claim 2, further comprising for each lease granted, returning data to a requesting client indicating a time at which the lease began and a duration of the lease.

4. The method of claim 3, further comprising computing lease expiration times at the clients in response to leases granted, wherein the lease expiration data specify the lease expiration times.

5. The method of claim 1, further comprising computing lease expiration times at the meta-data server, and transmitting data indicating the lease expiration times from the meta-data server to the clients.

6. A computer-implemented method for managing access to file data in a distributed file system including a storage server arrangement, a meta-data server, and a plurality of clients comprising:

submitting a lease request from a client to the meta-data server, the lease request referencing an object in the distributed file system;

when the object becomes available for lease, designating the object as leased to the client and transmitting a lease response to the client, the lease response including data that indicate a lease expiration time;

transmitting a storage access request referencing the object from the client to the storage server arrangement, the storage access request including data that indicate the lease expiration time; and denying access to the object if the lease expiration time is earlier than a current time.

7. The method of claim 6, wherein the lease request includes an object identifier and a requested lease duration.

8. The method of claim 7, wherein the data indicating the lease expiration time describes a time at which the lease began and a duration of the lease.

9. The method of claim 8, further comprising computing the lease expiration time at the client from the lease response.

10. The method of claim 6, further comprising computing the lease expiration time at the meta-data server.

11. An apparatus for managing access to objects by clients in a distributed file system including a storage server arrangement and a meta-data server, comprising:

means for managing leases on the objects;

means for communicating lease expiration data from the clients to the storage server arrangement along with storage access requests, the lease expiration data indicating a lease expiration time; and means for conditionally providing access to the object at the storage server arrangement if the lease expiration time is later than a current time.

12. A system for managing access to objects by clients in a distributed file system, comprising:

a meta-data server coupled to the clients, the meta-data server configured and arranged to manage leases to the objects responsive to requests from the clients, and transmit lease expiration data to the clients indicating lease expiration times; and a storage server arrangement coupled to the clients, the storage server arrangement configured and arranged to conditionally provide access to the objects in response to access requests from the clients that include data indicating lease expiration times, wherein access is provided in response to a request if the lease expiration time is earlier than a current time.

13. The system of claim 12, wherein the lease request includes an object identifier and a requested lease duration.

14. The system of claim 13, wherein the data indicating the lease expiration time describes a time at which the lease began and a duration of the lease.

15. The system of claim 14, wherein the meta-data server is further configured to compute lease expiration times.

* * * * *